United States Patent
Griffin et al.

(10) Patent No.: US 8,347,221 B2
(45) Date of Patent: Jan. 1, 2013

(54) TOUCH-SENSITIVE DISPLAY AND METHOD OF CONTROL

(75) Inventors: Jason Tyler Griffin, Waterloo (CA);
Todd Andrew Wood, Waterloo (CA);
Mihal Lazaridis, Waterloo (CA);
Shigeharu Furukawa, Arlington Heights, IL (US); Yu Gao, Waterloo (CA); Steven Robert Grenier, Mississauga (CA); Joel Paul Steele, Mississauga (CA)

(73) Assignee: Research In Motion Limited, Waterloo (CA)

( * ) Notice: Subject to any disclaimer, the term of this patent is extended or adjusted under 35 U.S.C. 154(b) by 565 days.

(21) Appl. No.: 12/574,824

(22) Filed: Oct. 7, 2009

(65) Prior Publication Data

US 2011/0083110 A1    Apr. 7, 2011

(51) Int. Cl.
*G06F 3/00* (2006.01)
*G06F 3/048* (2006.01)

(52) U.S. Cl. ........ 715/773; 715/705; 715/715; 715/764; 715/780; 715/864

(58) Field of Classification Search .......... 715/700–702, 715/705, 708, 711, 715, 764, 773, 780, 808, 715/863, 864
See application file for complete search history.

(56) References Cited

U.S. PATENT DOCUMENTS

| | | | |
|---|---|---|---|
| 5,917,476 A | 6/1999 | Czerniecki | |
| 6,529,186 B1 * | 3/2003 | Thayer | 345/161 |
| 6,680,677 B1 * | 1/2004 | Tiphane | 341/22 |
| 7,075,520 B2 * | 7/2006 | Williams | 345/169 |
| 7,098,896 B2 * | 8/2006 | Kushler et al. | 345/168 |
| 7,134,081 B2 * | 11/2006 | Fuller et al. | 715/735 |
| 7,362,305 B2 * | 4/2008 | Alsio et al. | 345/156 |
| 7,848,573 B2 * | 12/2010 | Wecker et al. | 382/186 |
| 7,895,518 B2 * | 2/2011 | Kristensson | 715/263 |
| 8,245,158 B1 * | 8/2012 | Schrick | 715/864 |
| 2004/0136564 A1 * | 7/2004 | Roeber et al. | 382/100 |
| 2005/0135678 A1 * | 6/2005 | Wecker et al. | 382/186 |
| 2006/0053387 A1 | 3/2006 | Ording | |
| 2006/0253793 A1 * | 11/2006 | Zhai et al. | 715/773 |
| 2007/0152980 A1 | 7/2007 | Kocienda et al. | |
| 2007/0174788 A1 * | 7/2007 | Ording | 715/816 |
| 2007/0247442 A1 * | 10/2007 | Andre et al. | 345/173 |
| 2007/0257896 A1 | 11/2007 | Huh | |
| 2008/0098331 A1 | 4/2008 | Novick et al. | |
| 2009/0007001 A1 * | 1/2009 | Morin et al. | 715/773 |
| 2009/0037837 A1 * | 2/2009 | Raghunath et al. | 715/773 |
| 2009/0135147 A1 * | 5/2009 | Hsu et al. | 345/173 |
| 2009/0251422 A1 * | 10/2009 | Wu et al. | 345/173 |
| 2010/0090964 A1 * | 4/2010 | Soo et al. | 345/173 |
| 2010/0125816 A1 * | 5/2010 | Bezos | 715/863 |
| 2010/0251161 A1 * | 9/2010 | Fong et al. | 715/773 |

(Continued)

OTHER PUBLICATIONS

Lance Ulanoff, BlackBerry Storm Rains on My Typing Parade, Nov. 20, 2008, 2 pages.*

(Continued)

*Primary Examiner* — Matt Kim
*Assistant Examiner* — Yongjia Pan

(57) ABSTRACT

A method includes displaying one or more selection options on a touch-sensitive display and detecting a hovering touch associated with a first option of the one or more selection options. Information associated with the first option is previewed in a first format in an information field in response to detecting the hovering touch. A selection of one of the one or more selection options is detected, and a function associated with the selected option is performed.

21 Claims, 6 Drawing Sheets

U.S. PATENT DOCUMENTS

2010/0333011 A1* 12/2010 Kornev et al. ............... 715/773
2011/0214084 A1* 9/2011 Kim ............................. 715/780

OTHER PUBLICATIONS

Lukas Mathis, Virtual Keyboards on iPhone and Android, Aug. 7, 2009, 8 pages.*
A Plea for the Fat-Fingered, Jan. 14, 2007, 6 pages.*

EP Extended Search Report for EP Application No. 10186825.5, dated Jul. 5, 2011, 7 pages.
Office Action dated Jan. 11, 2012, issued from corresponding EP patent application No. 10186825.5.
Office Action dated Oct. 5, 2012, issued from corresponding EP patent application No. 10186825.5.

* cited by examiner

US 8,347,221 B2

TOUCH-SENSITIVE DISPLAY AND METHOD OF CONTROL

FIELD OF TECHNOLOGY

The present disclosure relates to portable electronic devices, including but not limited to portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
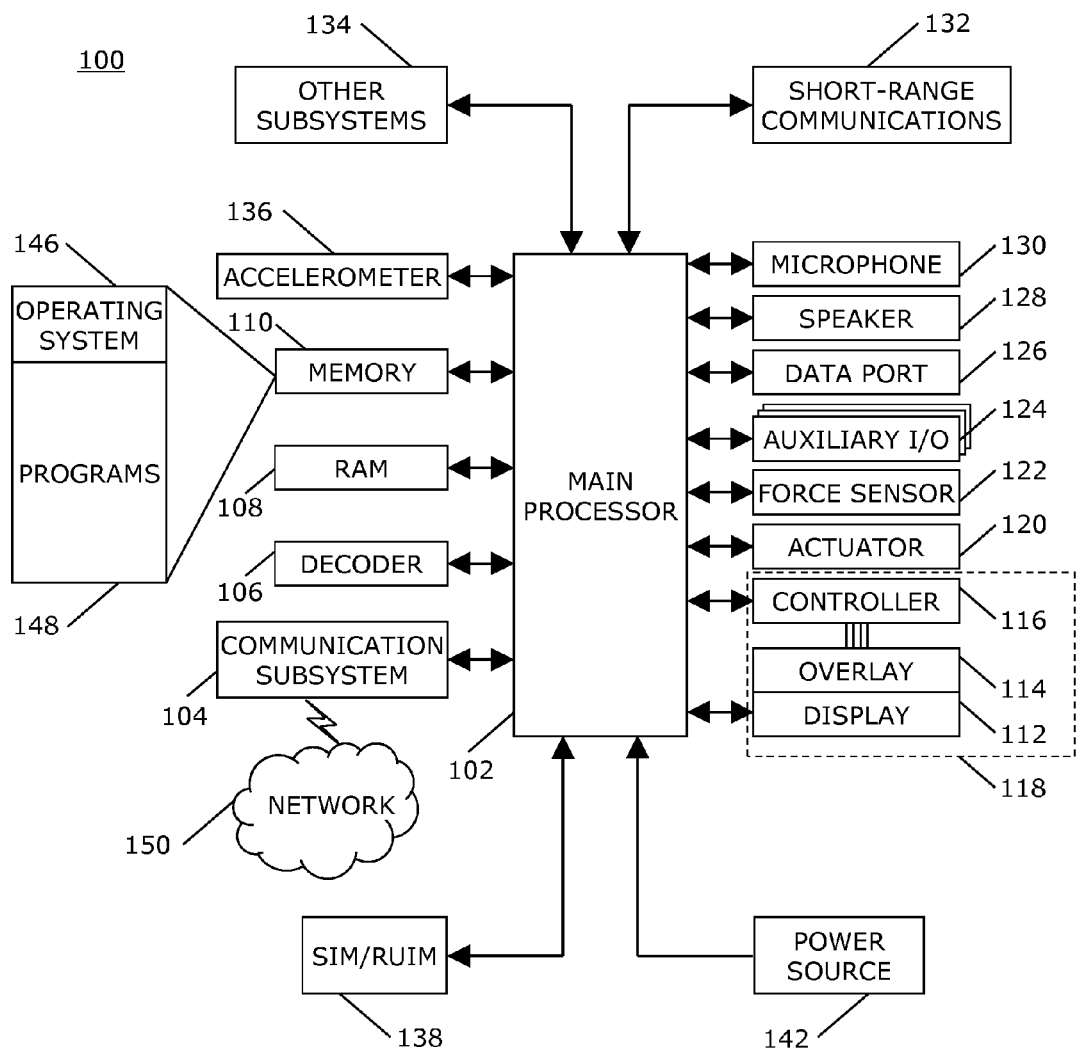
FIG. 1 is a block diagram of a portable electronic device in accordance with the disclosure.

The following describes an apparatus for and method of previewing selection options, such as characters or functions, on a touch-sensitive display of a portable electronic device. A variety of different previewing formats are described, including previewing text next to previously entered text. Selection options may be previewed until detection of selection of a selection option.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. The controller 116 and/or the processor 102 may detect a touch by any suitable contact member on the touch-sensitive display 118. Multiple simultaneous touches may be detected.

The actuator(s) 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 may result in provision of tactile feedback. Various different types of actuators 120 may be utilized, although only two are described herein. When force is applied, the touch-sensitive display 118 is depressible, pivotable, and/or movable.

Figure 2:
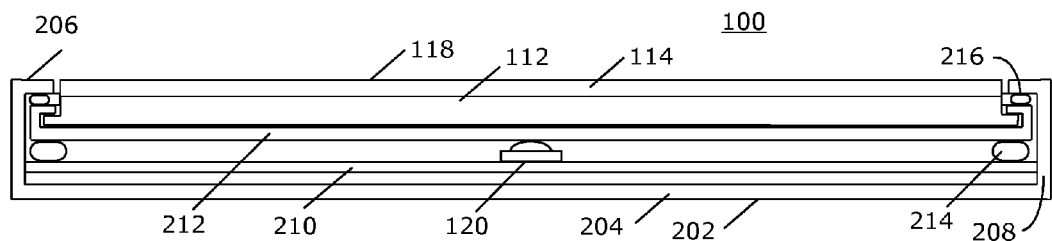
FIG. 2 is a sectional side view of a portable electronic device with a mechanical actuator in accordance with the disclosure.

A sectional side view of a portable electronic device 100 with a mechanical actuator 120 is shown in FIG. 2. The cross section is taken through the center of the actuator 120. The portable electronic device 100 includes a housing 202 that encloses components such as shown in FIG. 1. The housing 202 may include a back 204 and a frame 206 that houses the touch-sensitive display 118. Sidewalls 208 extend between the back 204 and the frame 206. A base 210 extends between the sidewalls 208, generally parallel to the back 204, and supports the actuator 120. In this example, a mechanical dome switch actuator is utilized. The display 112 and the overlay 114 are supported on a support tray 212 of suitable material, such as magnesium, and the support tray 212 is biased away from the base 210, toward the frame 206 by biasing elements 214, such as gel pads, between the support tray 212 and the base 210. Compliant or compressible spacers 216, which may also be gel pads, for example, may be located between the support tray 212 and the frame 206.

Figure 3:
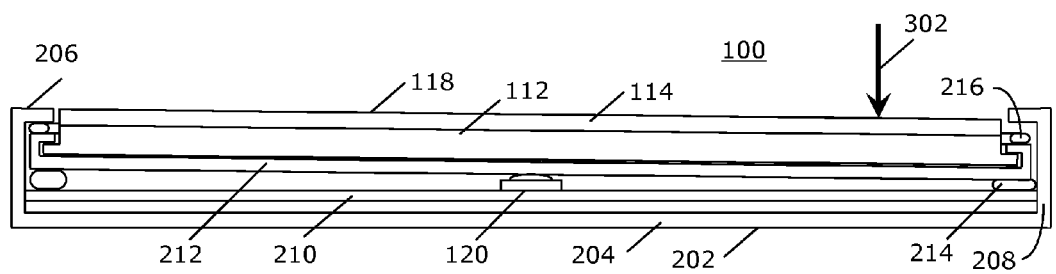
FIG. 3 is a sectional side view of a portable electronic device with a mechanical actuator depressed by a touch-sensitive display in accordance with the disclosure.

The touch-sensitive display 118 is moveable and depressible with respect to the housing 202. As the touch-sensitive display 118 is moved toward the base 210, the biasing elements 214 are compressed, and when sufficient force is applied, the actuator 120 is depressed or actuated as shown in FIG. 3. The touch-sensitive display 118 may also pivot within the housing to depress the actuator 120. A force 302 applied to one side of the touch-sensitive display 118 moves the display 118 toward the base 210, causing compression of the biasing elements 214 on that side of the touch-sensitive display 118, and depressing the actuator 120. The actuator 120 may be actuated by pressing anywhere on the touch-sensitive display 118. The processor 102 receives a signal when the actuator 120 is depressed or actuated. For a mechanical dome switch/actuator, tactile feedback is provided when the dome collapses due to imparted force and when the dome switch/actuator returns to the rest position after release of the switch. Although a single actuator is shown, any suitable number of actuators may be utilized and may be located in any suitable position.

Figure 4:
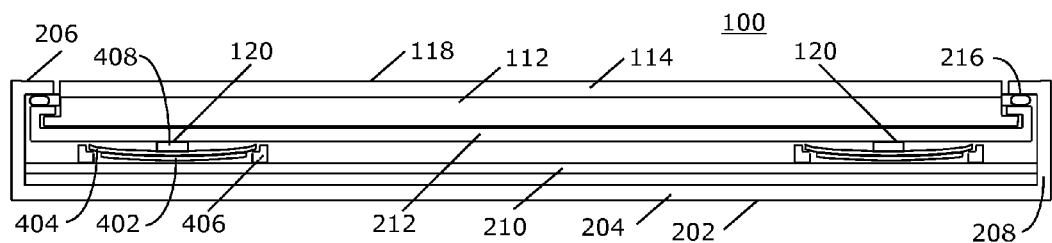
FIG. 4 is a sectional side view of a portable electronic device with piezo actuators in accordance with the disclosure.

A sectional side view of a portable electronic device with piezo actuators is shown in FIG. 4. The actuator 120 may comprise one or more piezoelectric (piezo) devices 402 that provide tactile feedback for the touch-sensitive display 118. The cross-section of FIG. 4 is taken through the middle of two of the four piezo devices 402 utilized in this example. The piezo devices 402 may be disposed between the base 210 and the support tray 212. Each piezo actuator 120 includes a piezoelectric device, such as a piezoelectric (PZT) ceramic disk 402 adhered to a substrate 404, which may be metal, such that the substrate bends when the PZT disk contracts diametrically, as a result of build up of charge at the PZT disk or in response to a force, such as an external force applied to the touch-sensitive display 118. Each substrate 404 and piezo disk 402 may be suspended from a ring-shaped frame or support ring 406 for supporting the piezo disk 402 while permitting flexing of the piezo disk actuator 120 as shown in FIG. 4. The support rings 406 may be disposed on the base 210 or may be part of the base 210, which may be a printed circuit board. Optionally, the substrate 404 may be mounted on a flat surface, such as the base 210. An element 408, which in the present example is a shock-absorber of suitable material such as a hard rubber, silicone, polyester, and/or polycarbonate, may be disposed between the piezo disk actuator 402 and the touch-sensitive display 118. This element 408 may provide a bumper or cushion for the piezo actuator 120 as well as facilitate actuation of the piezo actuator and/or one or more force sensors 122 that may be disposed between the piezo actuators 120 and the touch-sensitive display 118, e.g., the support tray 112.

Contraction of the piezo actuators 120 applies a spring-like force, for example, opposing a force externally applied to the touch-sensitive display 118. The charge may be adjusted by varying the applied voltage or current, thereby controlling the force applied by the piezo disks 402. The charge on the piezo actuator 120 may be removed by a controlled discharge current that causes the piezo disk 402 to expand, releasing the force thereby decreasing the force applied by the piezo disks 402. The charge may advantageously be removed over a relatively short period of time to provide tactile feedback to the user via the touch-sensitive display 118. Absent an external force and absent a charge on the piezo disk 402, the piezo disk may be slightly bent due to a mechanical preload.

When inputting information via the touch-sensitive display 118, the contact member often covers some to all of the selection option, e.g., the character or information being selected. In the case of a virtual or soft key of a keyboard, the character is at least partially covered and the information displayed for a selection button or key, such as a "cancel" button or function key such as an "enter" or "shift" key, is at least partially covered. Thus, the information being entered is typically at least partially covered. Keys or buttons are often closely located and displayed in a small area, and the contact member, such as a finger, is often larger than the displayed area for the character or information displayed for, or associated with, the key or button.

Figure 5:
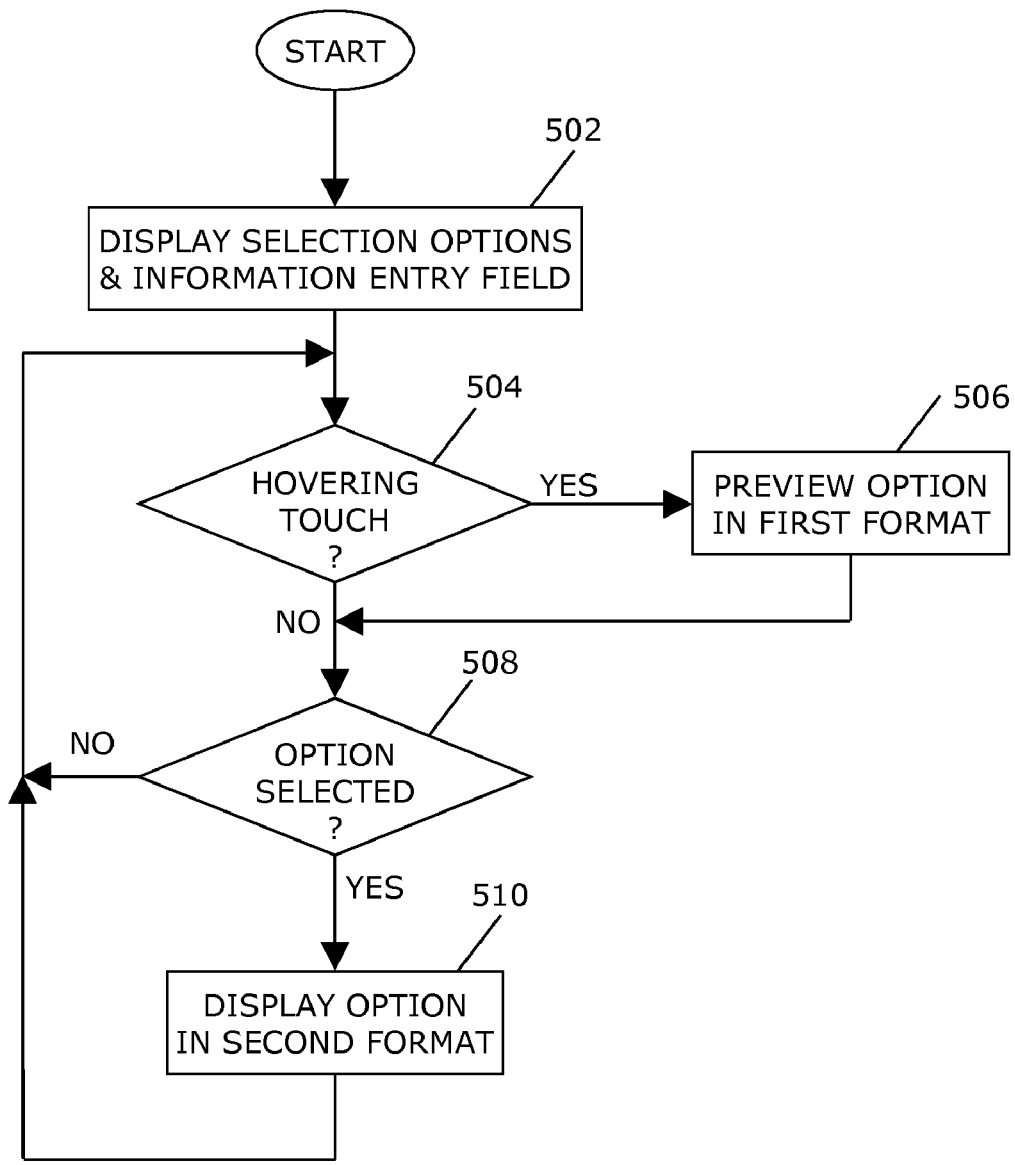
FIG. 5 is a flowchart illustrating a method of previewing selection options on a touch-sensitive display in accordance with the disclosure.

A flowchart illustrating a method of previewing selection options on a touch-sensitive display is shown in FIG. 5. The method may be carried out by software executed by, for example, the processor 102. Coding of software for carrying out such a method is within the scope of a person of ordinary skill in the art given the present description. Information is displayed 502 on the touch-sensitive display 118. The information may include selection options, for example, virtual or soft keys of one or more sets of keys associated with a keyboard, icons, text, lists such as emails or contacts, and selection windows or decision boxes such as unlock, delete, cancel, and so forth. The information may also include an information field, such as may be utilized to enter or input information, for example, text in an email or text message or names and related information in a contacts list. The information may also be part of a game, such as options that may be selected while playing the game, such as a word creation game from a collection of displayed letters.

When a hovering touch is detected 504 above a selection option, the selection option is previewed 506 by displaying information associated with the selection option in a preview format. A hovering touch is a touch where contact remains associated with a particular selection option for a predetermined period of time, e.g., 0.25, 0.5 seconds, 0.75 seconds, 1 second, and so forth, without selection of the particular selection option. The hovering time may be an option selected by the user. A range of hovering times may be chosen from effectively 0 seconds, i.e., from detection of a touch, to a longer period such as 1 second or longer. A user may be able to turn on previewing for every touch (e.g., 0 seconds) or turn off previewing completely (e.g., infinite hovering time). A preview format is a format noticeably different than the default format, i.e., the format in which information is normally displayed, e.g., a default or standard format, or the format of entered information. For example, when information is previewed in an information field, a character may be displayed in a ghosted, faded, highlighted, or other manner different than the information previously entered in the information field. The previewed character may be displayed after the last character entered in the information field, i.e., next to the previously entered character. Alternatively, the previewed selection option may be displayed in an information field shaped like a balloon, box, or window in a location that is remote from the location of the touch such that the information is visible. Examples of preview formats are shown in FIG. 6 through FIG. 16. Thus, selection options may be previewed in a visible manner before being selected by a user. For example, a character may be displayed in an alternate format without entering the character in the text field. Information may be previewed as long as the hovering touch remains associated with the same selection option and/or until a selection of any selection option is made.

Optionally, tactile feedback may be provided in conjunction with the preview of the information. For example, a low-amplitude vibration or buzz may be provided at the beginning of a preview or for the duration of the preview. Such tactile feedback may be provided, for example, by the piezoelectric devices described above.

When one of the selection options is selected 508, the selected option is displayed 510 in the default format. When selected, a function associated with the selected option is performed. For example, when the selection option is a key on a keyboard, the character associated with the displayed key is entered in the information field in the default format, e.g., the format in which information was previously entered in the information field. When the selection option is a function key, such as one associated with an alternate keyset such as numbers, symbols, punctuation, shift, shift lock, and so forth, the function is performed, for example, an numerical keyset may be displayed.

Detection of selection may comprise detecting depression of a movable touch-sensitive display 118, such as described above. Alternatively, detection of selection may comprise detecting depression of a physical key or selection of a key displayed on the touch-sensitive display 118. A user may select a soft key after hovering in a location associated with the soft key by simply pressing downward on the touch-sensitive display 118 in the same location as the hovering touch. Detecting the selection may comprise detecting selection in an area other than where the one or more selection options are displayed. For example, a touch of sufficient force to be considered a selection force, e.g., one that actuates the actuator 120, a double tap, or other selection touch in the information field may be detected. A separate area designated for selecting a preview may also be utilized. For example, a small area in one or more corners of the display may be set aside for selection such that one finger may hover while another one selects, thus facilitating faster typing.

A user may hover over several different selection options before selecting one. A preview of each of the different selection options is provided as a hovering touch is detected for each option. A selection option may be selected without first hovering about the selection option.

Preview formatting may comprise one or more of a variety of formats, including fading, ghosting, underscoring, italicizing, bolding, highlighted, blinking, and so forth. Preview formatting may also include a different color or font, as well as different size of the character. Preview formatting may be utilized in conjunction with a cursor. Combinations of formatting may be utilized, such as bold, italics, and underlined, or highlighted with a cursor, and so forth. Various examples are shown in FIG. 6 through FIG. 16. Circles are shown representing locations 606, 1206, 1306, 1406, 1502, 1504, 1602, 1604 of hovering touches for the simplicity of the drawing, although the detected touch or hovering touch may be resolved into a single point, multiple points, or an area of contact other than a circle.

Figure 6:
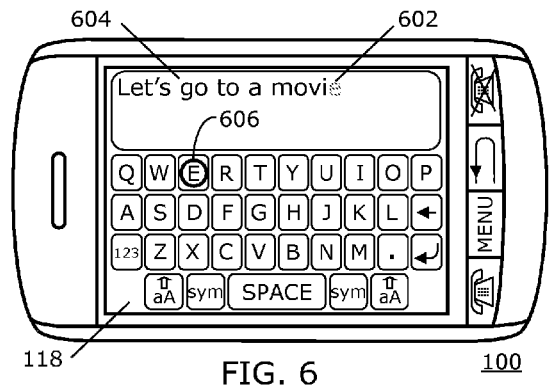
FIG. 6 illustrates preview of a character in a faded format in accordance with the disclosure.

Preview of a character in a faded format 602 is shown in FIG. 6. A landscape QWERTY keyboard is shown in FIG. 6 through FIG. 13. An information field 604, such as a character entry field where entered characters are displayed for an email application, is illustrated with the characters "Let's go to a movi" entered. A hovering touch is detected at a location 606 associated with the displayed "E" key, and a lowercase "e" is shown displayed in a faded or ghosted format 602 after the last character entered in the information field 604.

Figure 7:
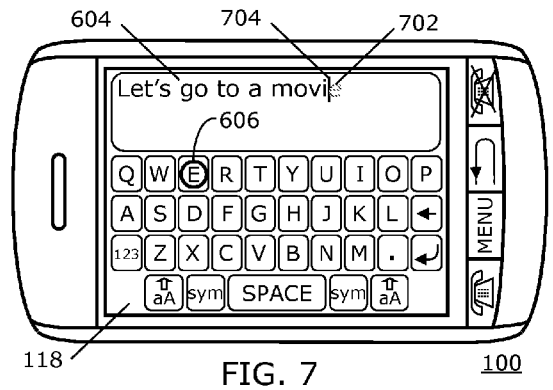
FIG. 7 and FIG. 8 illustrate preview of a character with respect to a cursor in accordance with the disclosure.
Figure 10:
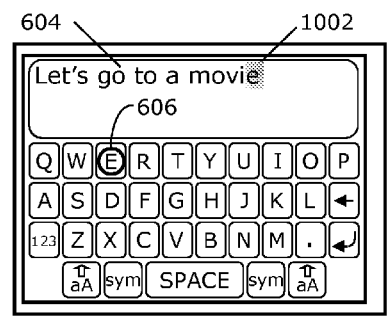
Figure 8:
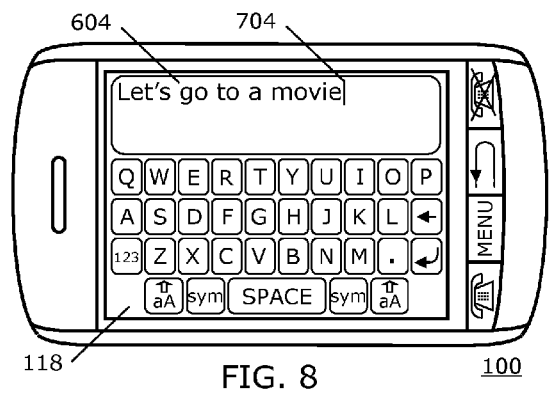
Figure 11:
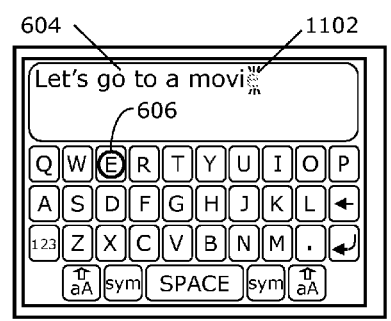

Preview of a character 702 with respect to a cursor is illustrated in FIG. 7 and FIG. 8. A cursor 704 may optionally be displayed with the entered text, for example, between the entered text and the previewed character 702. As shown in FIG. 7, the cursor 704 is an elongated bar, and appears before the lowercase "e" 702 shown italicized and faded. After the "e" is selected, the "e" is entered in the format of the rest of the entered characters to complete the word "movie" in the information field 604, and the cursor 704 is moved after the entered character as shown in FIG. 8.

Figure 9:
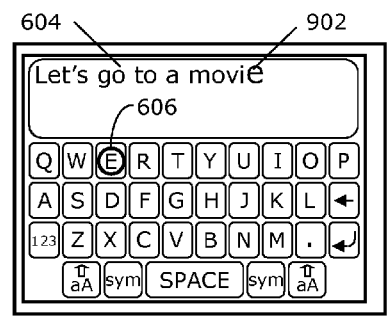
FIG. 9 through FIG. 14 illustrate preview of a character in a various formats in accordance with the disclosure.

A hovering touch detected at a location 606 associated with the displayed "E" key results in an enlarged, i.e., larger size than the normal format, "e" 902 previewed in the information field 604 in FIG. 9. Alternatively, a smaller size or shrunken version of a character (not shown) may be previewed. A hovering touch detected at a location 606 associated with the displayed "E" key results in a highlighted preview format for the "e" 1002 previewed in the information field 604 in FIG. 10, where highlighting may comprised an area of a different color or brightness around the displayed character. A hovering touch detected at a location 606 associated with the displayed "E" key results in a blinking preview format for the "e" 1102 previewed in the information field 604 in FIG. 11, where the displayed character blinks in and out, i.e., is displayed for a period of time, and not displayed for a different period of time. Blinking may also comprise a varying the brightness of the character from very bright to very dim or off.

Figure 12:
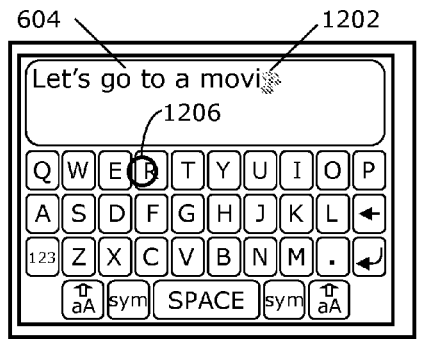
Figure 13:
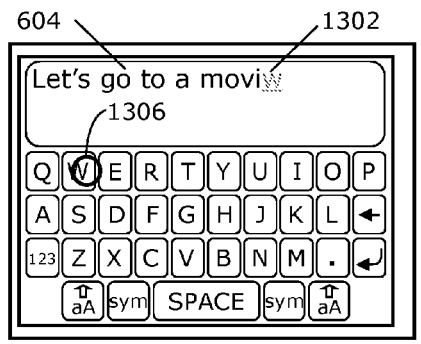
Figure 14:
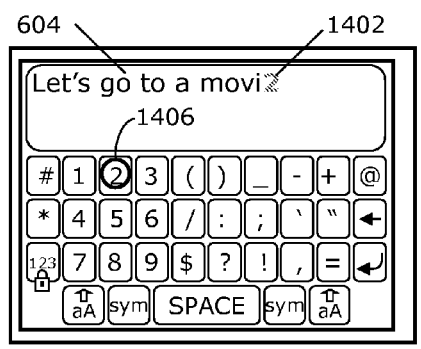

The examples of the preview formats in FIG. 12 through FIG. 14 illustrate when a character other than the one that appears to have been intended is previewed. A hovering touch detected at a location 1206 associated with the displayed "R" key results in a shadowed or shaded preview format for the "r" 1202 previewed in the information field 604 in FIG. 12. The "r" is also displayed in a different font than the normal format. Alternatively, the previewed character may be displayed in a different color than the normal format, e.g., if the normal format includes black text, the preview format may include, for example, yellow, green, gray, or blue text. In this example, a user may be approaching the displayed "E" key from the right, but the bottom of the user's finger rested on the "R" key, although the tip of the user's finger may be above the displayed "E" key. Similarly, a hovering touch detected at a location 1306 associated with the displayed "W" key results in an underscored or underlined preview format for the "w" 1302 previewed in the information field 604 in FIG. 13. In this example, a user may be approaching the displayed "E" key from the left, but the bottom of the user's finger rested on the "W" key, although the tip of the user's finger may be above the displayed "E" key. In the examples of FIG. 12 and FIG. 13, the use need only slide their finger over to a location associated with the "E" key before making a selection. If a hovering touch is detected above the displayed "E" key, an "e" is previewed for more accurate selection.

In the example of FIG. 14, the "123" or number lock key may be inadvertently activated, resulting in a hovering touch detected at a location 1406 associated with the displayed "2" key, which is previewed in a bolded, faded format 1402 in the information field 604. When the "123" key is again selected, the number lock is removed, and the QWERTY keys are again displayed for selection.

Figure 15:
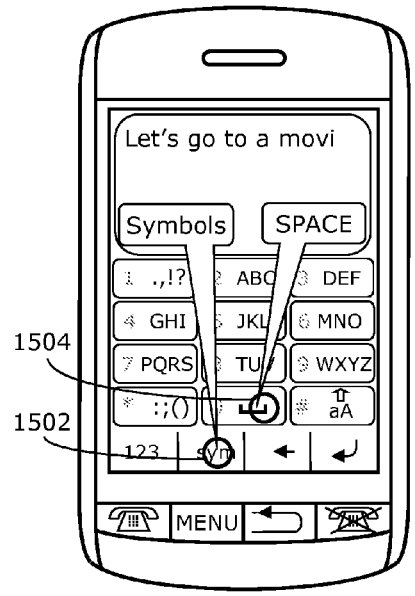
FIG. 15 through FIG. 18 illustrate preview of a various selection options in accordance with the disclosure.
Figure 16:
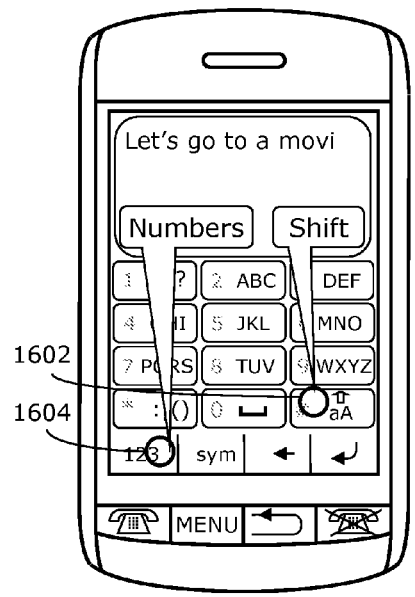

Preview of a various selection options is shown in FIG. 15 and FIG. 16. A portrait keyboard with a reduced keyset is shown in FIGS. 15 and 16. Various keys on a keyboard or other selection options such as cancel, unlock, or delete buttons to name a few, are not associated with characters that may easily or understandably be displayed with entered text. Such selection options may be previewed in an information field that takes the form of a window, box, balloon, and so forth in a location remote from the location of the selection option. When a hovering touch is detected at a location 1502 associated with the displayed "sym" key as shown in FIG. 15, a balloon is displayed with the word "Symbols" displayed inside, but the symbol keys are not displayed until a selection associated with the "sym" key is detected. When a hovering touch is detected at a location 1504 associated with the displayed "space" key as shown in FIG. 15, a balloon is displayed with the word "SPACE" is displayed inside, but the space is not entered in the text until a selection associated with the "space" key is detected. When a hovering touch is detected at a location 1602 associated with the displayed "123" key as shown in FIG. 16, a balloon is displayed with the word "Numbers" displayed inside, but the number keys are not displayed until a selection associated with the "123" key is detected. When a hovering touch is detected at a location 1604 associated with the displayed "aA" or shift key as shown in FIG. 16, a balloon is displayed with the word "Shift" displayed inside, but the shift is not engaged until a selection associated with the shift key is detected. Although the balloon, box, or window may be located anywhere away from the touch, the balloon, box, or window may be advantageously located below the last entered text, and a tail or other connective element may extend from the location of the hovering touch to the balloon, box, or window.

Figure 17:
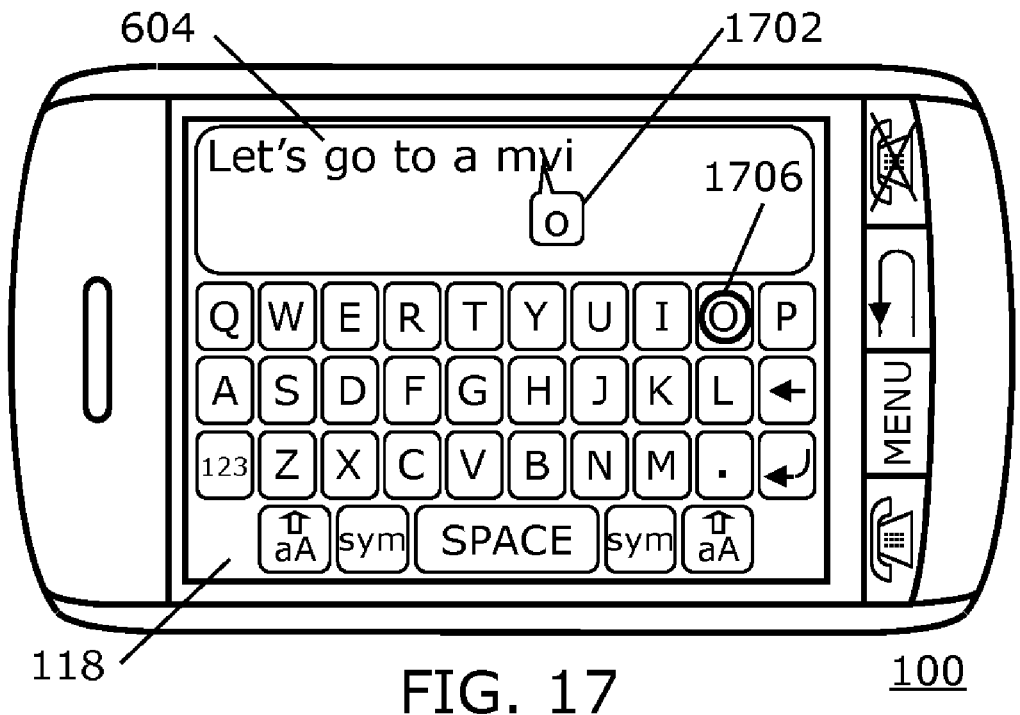
Figure 18:
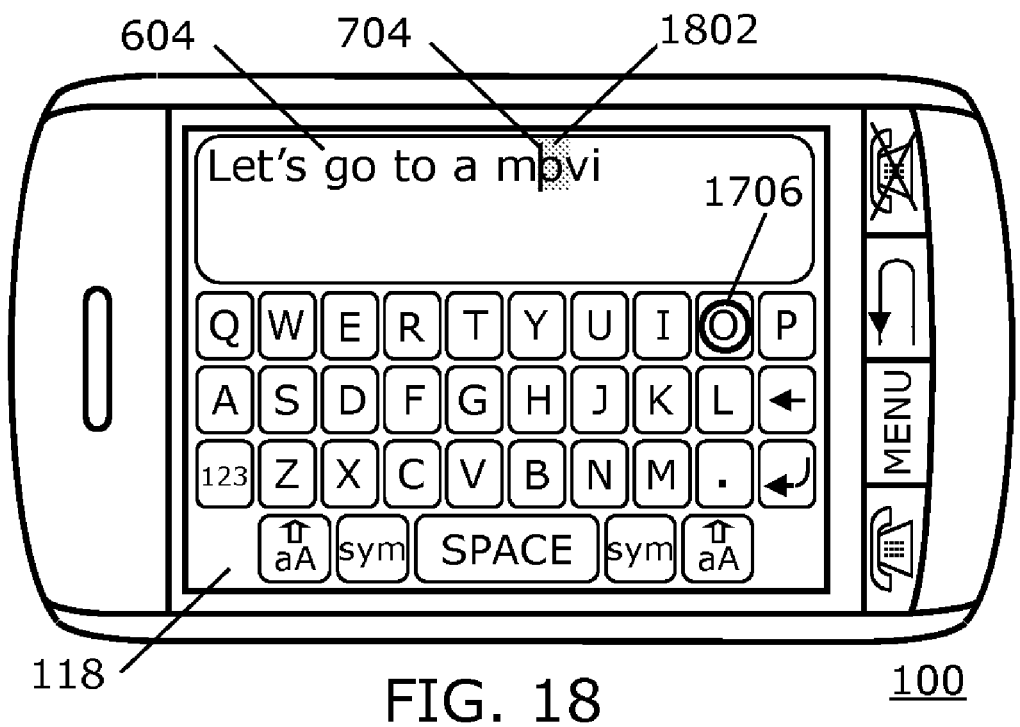

Characters or words may also be inserted in the middle of entered character strings or text. In the examples of FIG. 17 and FIG. 18, "Let's go to a mvi" has been entered in the information field 604. The user may wish to add an "o" to the entered text "mvie" to complete the word. The entry of one or more characters that may be inserted in the middle of entered text or an entered character string may also be previewed. For example, a balloon with a tail pointing to the entry location may be utilized to preview a character, such as the "o" shown in FIG. 17. The "o" may be selected for entry by depressing the touch-sensitive display 118 either at the location 1706 of the hovering touch associated with the "o" or at the location of the balloon, window, or box 1702. The character may be displayed in the balloon, window, or box 1702 utilizing any preview format, such as described above, or in the normal or default format. Alternatively, the inserted character may be previewed in its location in the entered text or entered character string, such as shown in FIG. 18. In this example, the cursor 704 is displayed along with the previewed character 1802 in a highlighted preview format. The character may be displayed among the characters of the entered text/character string utilizing any preview format, such as described above.

When practicing the teachings of the present disclosure, more accurate typing on a touch-sensitive display results. A user need not spend time deleting incorrect input and replacing such input with a correct entry. Speed and accuracy may be improved. A preview of a selection option may be provided in a variety of different formats. The selection option may be displayed next to the text previously entered, rendering a more visually appealing display of the previewed selection option than more distally located previewing methods. The selection option may be previewed until a selection is detected by the device 100, rather than for a short period of time that may not be sufficient and may need to be repeated.

A method comprises displaying one or more selection options on a touch-sensitive display, detecting a hovering touch associated with a first option of the one or more selection options, and previewing, in a first format in an information field, information associated with the first option in response to detecting the hovering touch. A selection of one of the one or more selection options is detected. A function associated with the selected option is performed. The function may comprise: displaying, in a second format, the information associated with the selected option in response to detecting the selection, wherein the first format is different from the second format or displaying at least one alternate selection option that is different than the one or more selection options.

Detecting the selection may comprise: detecting depression of a movable touch-sensitive display or detecting selection in an area other than where the one or more selection options are displayed. Displaying the one or more selection options may comprise displaying a keyboard comprising a plurality of characters. Displaying in the second format may comprise displaying in a format of information previously entered in the information field. Previewing may comprise: displaying a character in a faded format; displaying a character in a font that is different than the font of the second format; displaying a character in a color that is different than the color of the second format; displaying an underscored, italicized, or bolded character; displaying a blinking or highlighted character; displaying a shaded, shadowed, enlarged, or shrunken version of a character; displaying information associated with the first option in a window, box, or balloon located remotely from the first option when the information comprises two or more characters; displaying a character after a last character entered in the information field; displaying a character in the middle of a character string entered in the information field; and/or displaying a character with a cursor in the information field. A cursor may be moved after the information associated with the first option after detecting the selection and entering the information. A computer-readable medium may have computer-readable code executable by at least one processor of the portable electronic device to perform the method.

Alternatively, the method may comprise displaying a first keyset of a plurality of selectable sets of keys and detecting a hovering touch associated with a first key of the first keyset, wherein the first key is associated with a first character. The first character may be displayed in a first format in an information field in response to detecting the hovering touch. A selection of the first key may be detected, and the first character may be displayed in a second format in response to detecting the selection. The first format is different from the second format.

A portable electronic device comprises a touch-sensitive display that is depressible through movement with respect to a housing of the portable electronic device and at least one processor configured to: display one or more selection options on the touch-sensitive display; detect a hovering touch associated with a first option of the one or more selection options; previewing by displaying, in a first format in an information field, information associated with the first option in response to detecting the hovering touch; detect a selection of the first option; and display, in a second format, the information associated with the first option in response to detecting the selection, wherein the first format is different from the second format.

Alternatively, the method may comprise displaying a first keyset of a plurality of selectable sets of keys on a touch-sensitive display that is movable with respect to a housing of a portable electronic device and detecting a hovering touch associated with a first key of the first keyset, wherein the first key is associated with a first character. In response to detecting the hovering touch, the first character may be displayed in a first format in an information field displayed on the touch-sensitive display, wherein entered characters are displayed in the information field. A selection of the first key may be detected by detecting depression of the touch-sensitive display, and the first character may be displayed in a second format in response to detecting the selection, wherein the first format is different from the second format.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
 displaying one or more selection options on a touch-sensitive display;
 detecting a hovering touch associated with a first option of the one or more selection options;
 when the first option is associated with a single character:
  previewing the first option in a first format in a character entry field in response to detecting the hovering touch;
  detecting a selection of the first option;
  in response to detecting the selection, displaying the single character in a second format in the character entry field, wherein the first format is different from the second format;
 when the first option is associated with two or more characters, displaying information associated with the first option in a window, box, or balloon located remotely from the first option, wherein the window, box, or balloon includes keyboard selection options not associated with characters that would be displayed with entered text.

2. The method of claim 1, wherein entered characters are displayed in the character entry field.

3. The method of claim 1, wherein the displaying information comprises displaying at least one alternate selection option that is different than the one or more selection options.

4. The method of claim 1, wherein detecting the selection comprises detecting depression of a movable touch-sensitive display.

5. The method of claim 1, wherein detecting the selection comprises detecting selection in an area other than where the one or more selection options are displayed.

6. The method of claim 1, wherein displaying the one or more selection options comprises displaying a keyboard comprising a plurality of characters.

7. The method of claim 1, wherein displaying in the second format comprises displaying in a format of information previously entered in the character entry field.

8. The method of claim 1, wherein previewing comprises displaying a character in a faded format.

9. The method of claim 1, wherein previewing comprises displaying a character in a font that is different than the font of the second format.

10. The method of claim 1, wherein previewing comprises displaying a character in a color that is different than the color of the second format.

11. The method of claim 1, wherein previewing comprises displaying an underscored, italicized, or bolded character.

12. The method of claim 1, wherein previewing comprises displaying a blinking or highlighted character.

13. The method of claim 1, wherein previewing comprises displaying a shaded, shadowed, enlarged, or shrunken version of a character.

14. The method of claim 1, wherein previewing comprises displaying a character after a last character entered in the character entry field.

15. The method of claim 1, wherein previewing comprises displaying a character in the middle of a character string entered in the character entry field.

16. The method of claim 1, wherein previewing comprises displaying a character with a cursor in the character entry field.

17. The method of claim 1, further comprising moving a cursor after the information associated with the first option after detecting the selection and entering the information.

18. A computer-readable device having computer-readable code executable by at least one processor of the portable electronic device to perform the method of claim 1.

19. A method comprising:
- displaying a first keyset of a plurality of selectable sets of keys;
- detecting a hovering touch associated with a first key of the first keyset;
- when the first key is associated with a first character:
  - displaying the first character in a first format in a character entry field in response to detecting the hovering touch;
  - detecting a selection of the first key;
  - displaying the first character in a second format in the character entry field in response to detecting the selection, wherein the first format is different from the second format;
- when the first key is associated with two or more characters, displaying information associated with the first key in a window, box, or balloon located remotely from the first key, wherein the window, box, or balloon includes keyboard selection options not associated with characters that would be displayed with entered text.

20. A portable electronic device comprising:
- a touch-sensitive display;
- at least one processor configured to:
  - display one or more selection options on the touch-sensitive display;
  - detect a hovering touch associated with a first option of the one or more selection options;
  - when the first option is associated with a first character:
    - preview by displaying, in a first format in a character entry field, information associated with the first option in response to detecting the hovering touch;
    - detect a selection of the first option;
    - display, in a second format in the character entry field, the information associated with the first option in response to detecting the selection, wherein the first format is different from the second format;
  - when the first option is associated with two or more characters, display information associated with the first option in a window, box, or balloon located remotely from the first option, wherein the window, box, or balloon includes keyboard selection options not associated with characters that would be displayed with entered text.

21. A method comprising:
- displaying a first keyset of a plurality of selectable sets of keys on a touch-sensitive display of a portable electronic device;
- detecting a hovering touch associated with a first key of the first keyset;
- when the first key is associated with a first character:
  - in response to detecting the hovering touch, displaying the first character in a first format in a character entry field displayed on the touch-sensitive display, wherein entered characters are displayed in the character entry field;
  - detecting a selection of the first key by detecting depression of the touch-sensitive display;
  - displaying the first character in a second format in the character entry field in response to detecting the selection, wherein the first format is different from the second format;
- when the first key is associated with two or more characters, displaying information associated with the first key in a window, box, or balloon located remotely from the first key, wherein the window, box, or balloon includes keyboard selection options not associated with characters that would be displayed with entered text.

* * * * *